United States Patent [19]
Ni et al.

[11] Patent Number: 6,062,729
[45] Date of Patent: May 16, 2000

[54] RAPID IR TRANSMISSION THERMOMETRY FOR WAFER TEMPERATURE SENSING

[75] Inventors: Tuqiang Ni, Fremont; Michael Barnes, San Francisco, both of Calif.

[73] Assignee: Lam Research Corporation, Fremont, Calif.

[21] Appl. No.: 09/050,897

[22] Filed: Mar. 31, 1998

[51] Int. Cl.[7] .............................. G01J 5/10; G01N 25/00
[52] U.S. Cl. ...................... 374/161; 374/121; 374/124; 374/126; 374/128; 374/131; 374/137
[58] Field of Search .................... 374/121, 127, 374/130, 131, 161, 2, 128, 124, 126

[56] References Cited

U.S. PATENT DOCUMENTS

| | | | |
|---|---|---|---|
| 4,956,538 | 9/1990 | Moslehi | 374/161 |
| 5,183,338 | 2/1993 | Wickersheim | 374/131 |
| 5,255,286 | 10/1993 | Moslehi et al. | 374/161 |
| 5,270,222 | 12/1993 | Moslehi | 437/8 |
| 5,326,171 | 7/1994 | Thompson et al. | 374/128 |
| 5,568,978 | 10/1996 | Johnson et al. | 374/161 |

OTHER PUBLICATIONS

"Model DRS 1000 for In–Situ Temperature Measurement"; commercial literature from Thermionics Northwest Inc.; 2 pages, (no date).

*Primary Examiner*—G. Bradley Bennett
*Assistant Examiner*—Gail Verbitsky
*Attorney, Agent, or Firm*—Burns, Doane, Swecker & Mathis, L.L.P.

[57] ABSTRACT

A method and apparatus for measuring the temperature of an object, such as a substrate, during processing. The object is illuminated by a light source. Infrared light that is transmitted through the object is then collected and transmitted to a photodiode. The amount of light transmitted through the substrate varies as a function of substrate temperature. The photodiode generates a signal in response to the light transmitted to the photodiode and an analyzing device generates a real-time temperature reading based on the signal. The photodiode may include at least one silicon photodiode or a plurality of photodiodes made from germanium or indium/gallium/arsenide.

21 Claims, 3 Drawing Sheets

RAPID IR TRANSMISSION THERMOMETRY FOR WAFER TEMPERATURE SENSING

FIELD OF THE INVENTION

The invention relates generally to methods and apparatus for temperature measurement. In particular, it relates to methods and apparatus for measuring the temperature of a semiconductor substrate during processing thereof.

BACKGROUND OF THE INVENTION

In chambers used for chemical vapor deposition (CVD), physical vapor deposition (PVD), etching, rapid thermal processing (RTP), or similar processes, in which substrates such as semiconductor wafers, flat panel displays, etc., are processed, it is common to support the substrate on a substrate support such as an electrostatic chuck. The temperature of the substrate may be monitored and controlled during processing.

Optical temperature measurement techniques can be used to monitor real-time temperature of the substrate during processing. One technique of monitoring temperature involves measuring the infrared (IR) energy emitted from the surface of a heated substrate, then converting this measured energy into a temperature reading.

A scanning monochrometer and lock-in amplifier manufactured by Thermionics Northwest, Inc. as model DRS 1000™ has been used to measure reflected light from a wafer. The reflected light varies in spectrum with the temperature of the wafer, thereby permitting the temperature of the wafer to be determined from this measurement. In order to permit the monochrometer to accurately scan over a range of reflected wavelengths, a series of filters are rotated within the monochrometer. This method, and its associated apparatus, are bulky, expensive, and slow.

U.S. Pat. No. 4,956,538 to Moslehi, the disclosure of which is hereby incorporated by reference, discloses another technique wherein laser energy is used to determine the real-time emissivity of the substrate based on a measurement of reflectance, and optionally reflectance in combination with transmittance. This real-time emissivity is then used to calibrate a pair of pyrometers, from which a temperature measurement is derived. The arrangement of Moslehi includes a complex system of mirrors and light pipes for purposes of accurately measuring light reflected off the surface of a semiconductor substrate.

Various problems are known to exist with such techniques which can adversely affect accuracy. First, such techniques are very sensitive to the optical properties of the substrate surface (sometimes referred to as emissivity). Second, light that originates from other areas within the processing chamber, such as a plasma field, acts as "noise" which adversely affects the accuracy of the measurement. Third, substrates often become transparent or semi-transparent during normal processing temperatures. When a photodetector is located above the substrate to measure reflected light, the detector looks "through" the substrate thereby adversely affecting the accuracy of the measurement. Fourth, the "window" through which the light source transmits light into the processing chamber can become obscured by the materials within the processing chamber which can attach themselves to the surface of the window.

It has proven difficult to accurately measure substrate temperatures during processing and, accordingly, temperature control suffers. Therefore, it is desirable to provide a method and apparatus for reliably monitoring substrate temperature during processing.

SUMMARY OF THE INVENTION

It is an object of the present invention to overcome the above mentioned problems, and others, by providing an apparatus and technique that accurately measures the real-time temperature of a substrate.

In accordance with one aspect of the present invention, an apparatus for measuring the temperature of a substrate during processing includes a light source illuminating an object, such as a substrate, an optical transmission device in communication with the light source, a receiving device collecting infrared light transmitted through the object and a photodiode in communication with the receiving device generating a signal in response to the light transmitted from the receiving device to the photodiode, the signal varying in response to the light transmitted to the photodiode, and an analyzing device which analyzes the signal and generates a temperature reading.

In accordance with another aspect of the present invention, a semiconductor processing apparatus is provided that includes a processing device defining a processing chamber, a substrate positioned on a substrate support located within the chamber, a light source providing broad-band light into the chamber and illuminating the substrate, a receiving device located beneath the substrate collecting infrared light transmitted through the substrate, first and second photodiodes in communication with the receiving device and generating variable and reference signals in response to the light transmitted from the receiving device to the photodiodes, the variable signal varying in response to the light transmitted to the first photodiode and the reference signal corresponding to an amount of light transmitted through the substrate over a range of wavelengths not affected by the substrate temperature, and an analyzing device which compares the variable signal to the reference signal and generates a temperature reading.

According to another aspect of the present invention, a method of measuring the temperature of a substrate during processing is provided. The method includes the steps of introducing broad-band light into a processing chamber and illuminating a substrate disposed in the chamber, collecting infrared light transmitted through the substrate, transmitting the infrared light to at least one photodiode, generating a signal with the photodiode that varies in response to the intensity of the transmitted light, and analyzing the signal to derive the temperature of the substrate.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION OF THE PREFERRED EMBODIMENTS

The present invention utilizes infrared (IR) transmission thermometry for in-situ substrate temperature measurement during semiconductor processing. This technique is based upon the relationship between the wavelength of IR light transmitted through a material and temperature. This relationship is associated with the band gap of a semiconductor material. The apparatus and technique described herein are particularly suited for measuring the temperature of a semiconductor wafer during processing. The apparatus and technique of the present invention are also applicable to the temperature measurement of wafers having various diameters such as up to approximately 300 mm or greater.

Figure 1:
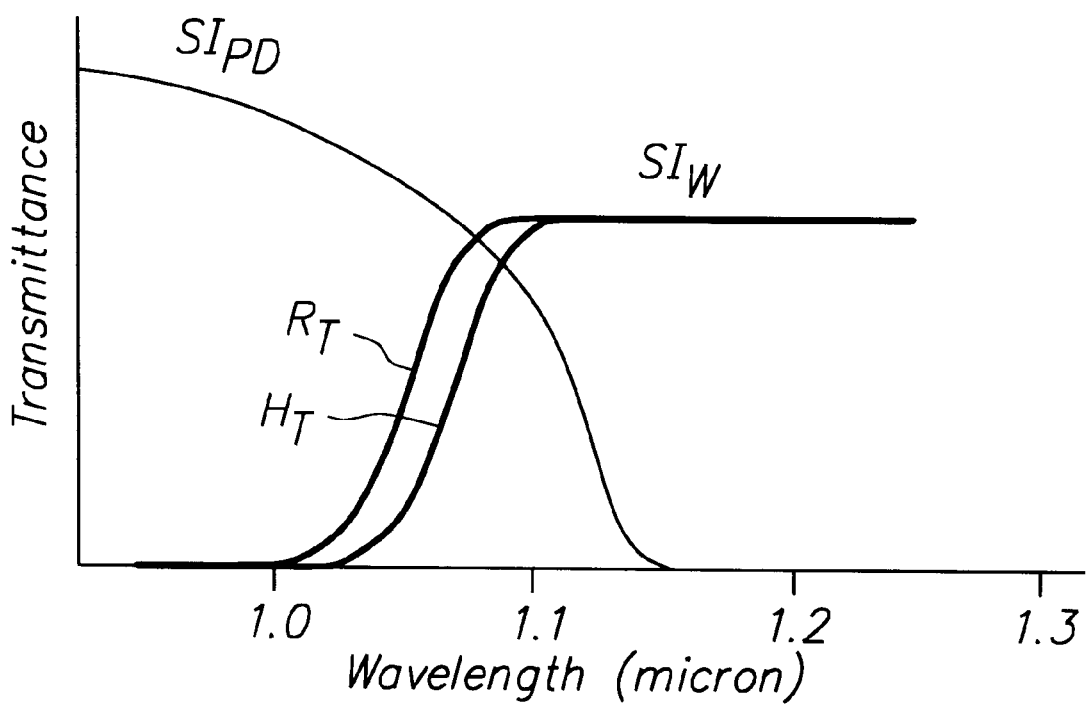
FIG. 1 is a graph illustrating the transmission wavelength spectra of a silicon substrate at different temperatures, as well as a response curve for a silicon photodiode.

FIG. 1 illustrates the spectrum of transmitted IR light for a silicon substrate. Two silicon substrate transmission curves $Si_w$ are illustrated. One curve represents the transmittance (ratio of light transmitted through the silicon substrate to the light incident upon the substrate) versus wavelength at room temperature $R_T$. The other curve represents the transmittance versus wavelength at a temperature $H_T$ above room temperature. As illustrated, the transmission spectrum shifts to longer wavelengths as the temperature increases. With proper selection of IR detector, or the combination of detector and filter, the real-time substrate temperature can be determined from a transmitted IR signal based on this relationship.

Figure 2:
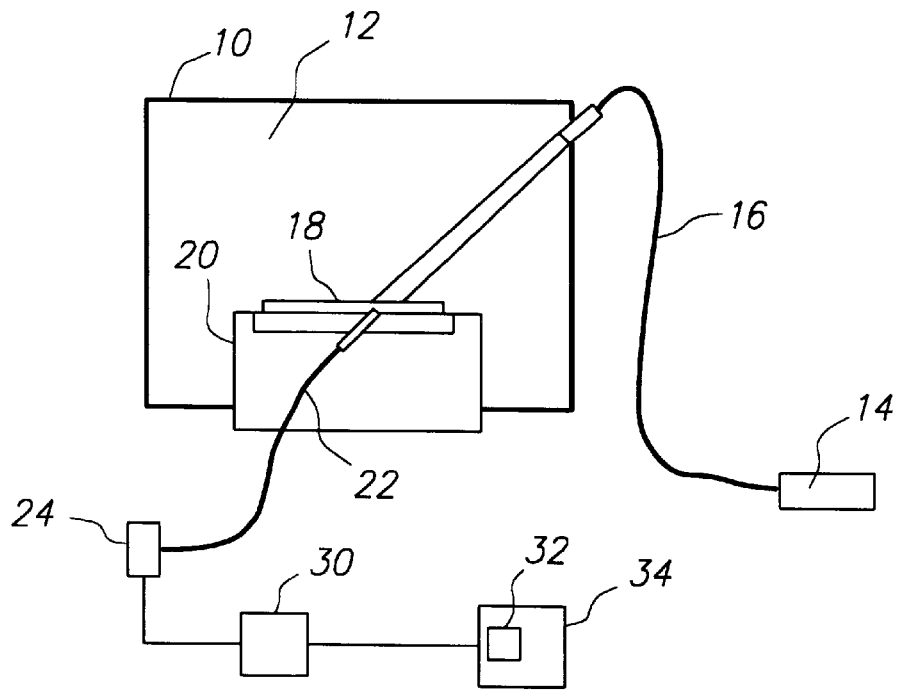
FIG. 2 is a schematic illustration of an embodiment of a temperature sensing apparatus and technique of the present invention.

One embodiment of an apparatus and technique for measuring temperature is shown in FIG. 2. A processing device 10 defines a processing chamber 12. Various semiconductor processes such as chemical vapor deposition (CVD), physical vapor deposition (PVD), rapid thermal processing (RTP), or plasma etching may be carried out in the chamber 12.

Broad-band light from an external light source 14 is delivered into the process chamber 12 via a fiber optic transmission cable 16. Light source 14 can be any suitable source generating IR light, such as an incandescent light source. One example of such a source is a tungsten light bulb. A semiconductor substrate 18 being processed, such as a silicon semiconductor wafer, is mounted upon a substrate support 20 within the chamber 12. However, the substrate may comprise other semiconductor materials such as germanium (Ge) or indium-gallium-arsenide (In/Ga/As), flat panel displays, or the like. In wafer processing, the wafer may have a diameter up to or larger than 300 mm. The substrate support may comprise any suitable device, such as an electrostatic chuck, mechanical chucking arrangement, etc.

In the FIG. 2 arrangement, the light introduced into the chamber 12 illuminates the substrate 18. A receiving optical fiber bundle 22 is located beneath the substrate 18 and collects IR light transmitted through the substrate 18 and sends it to a photodetector 24. The type of photodetector 24 is preferably based upon the characteristics of the substrate material. The photodetector should be capable of detecting and responding to the transmitted spectrum of light over a range of temperatures. One suitable photodetector is a made from silicon (hereafter referred to as "silicon photodiode"). These devices are commercially available. For example, one such device is manufactured by Motorola under product number MD500. Another similar device is manufactured by Hamamatsu Corporation under product number S1336. A silicon photodiode is generally effective for sensing and responding to light with a wavelength shorter than approximately 1.15 microns, as illustrated by the silicon photodiode response curve $Si_{PD}$ of FIG. 1. As shown by this curve, the IR transmission spectrum of the light passing through the silicon substrate 18 shifts to longer wavelengths due to an increase in temperature and the response signal generated by the silicon photodiode will decrease as the wavelength approaches 1.15 microns.

Figure 5:
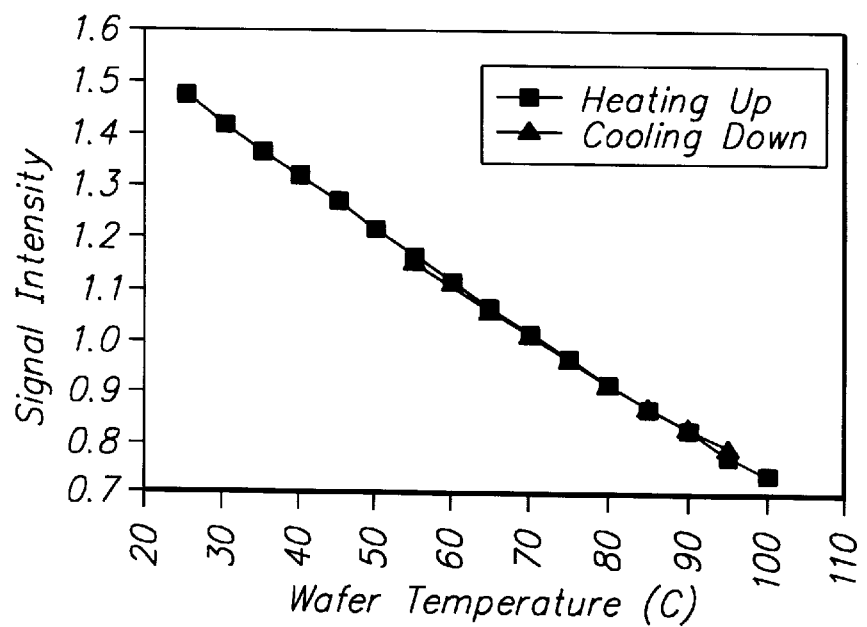
FIG. 5 is a graph illustrating a calibration curve plotting temperature versus signal intensity.

The signal produced by the photodiode 24 can be processed in various ways to render the desired temperature measurement. In one arrangement, an analog signal is generated by the photodiode 24 in response to the transmitted light. This analog signal can be transmitted to an analyzing device which includes a signal amplifier 30. The signal amplifier 30 may include filters (not shown) that reduce electronic interference. The analog signal is then converted to a digital signal using an analog-to-digital converter 32. This digital signal can then be read by a computer 34 and compared to calibration curve data stored in the computer to generate a temperature reading. As illustrated in FIG. 5, the calibration curve data renders a temperature value for a particular signal strength. The converter 32 may be contained within the housing of the computer as a "board" component. Alternatively, the converter 32 may be a separate device externally connected to the computer 34. In FIG. 5, the temperature range of interest is in the range of 25 to 100° C. However, the temperature measurement technique according to the invention can be used for other temperature ranges applicable to semiconductor substrate processing.

In order to accurately determine real-time temperature, the measured signal generated during substrate processing is first normalized against a signal taken at room temperature immediately after the substrate is placed on the substrate support. As noted above, one problem associated with optical temperature measurement is that the window through which the external light source 14 supplies light to the processing chamber 12 can become clouded or covered with materials generated during processing within the processing chamber 12. This phenomena is especially evident during processes such as plasma etching, during which byproducts can become attached to the window. When this occurs, less light is introduced into the chamber than is generated by the light source. Therefore, less light is sensed by the photodetector due to this phenomena. By comparing the measured signal taken during processing with the signal taken at room temperature, any reduction in light intensity due to previous buildup on the window can be compensated for and the accuracy of the temperature measurement improved. Comparison of the normalized signal with a calibration curve yields the current substrate temperature.

Inaccurate temperature readings may also be generated if light energy from sources other than the external light source 14 is transmitted through the substrate 18. One such source is plasma generated within the process chamber 12 during substrate processing. In order to avoid potential interference from plasma emissions, the light source 14 may be modulated. For example, while the external light source 14 is turned off temporarily, a first measurement of the amount of energy being transmitted through the substrate is measured by the photodetector 24. This amount represents the approximate amount of light energy being transmitted through the substrate due to plasma emissions. When the external light source 14 is turned back on, a second measurement of transmitted light is taken. The first measurement can then be subtracted from the second measurement to obtain a more accurate reading of the transmittance through of the substrate. It can be desirable to modulate the light source continuously throughout the period during which the temperature of the substrate is measured because the level of plasma emissions may change during processing of the substrate. By way of example only, the frequency of a modulation cycle for the light source 14 can be approximately 1 second on, followed by a period of 1 second off.

In another embodiment of the present invention, the photodiode can be a broad band photodetector, such as a germanium or indium-gallium-arsenide photodiode, optionally coupled with a filter such as a narrow band optical filter. Such arrangements are useful for measuring the temperature of substrates 18 made of materials in addition to those made of silicon. The filter preferably allows the photodetector 24 to sense a range of wavelengths within which the above mentioned temperature-dependent shift occurs. This range of wavelengths is specific to the material of the substrate 18. The filter preferably excludes light of other wavelengths thereby improving the strength and clarity of the signal generated by the photodiode 24 when the temperature-induced shift in wavelengths occurs. When compared to the range of wavelengths over which a temperature-induced shift occurs for a silicon photodetector, the use of a broad band photodetector and selective filter can enable detection over a range of wavelengths corresponding to a desired range of temperatures.

Figure 3:
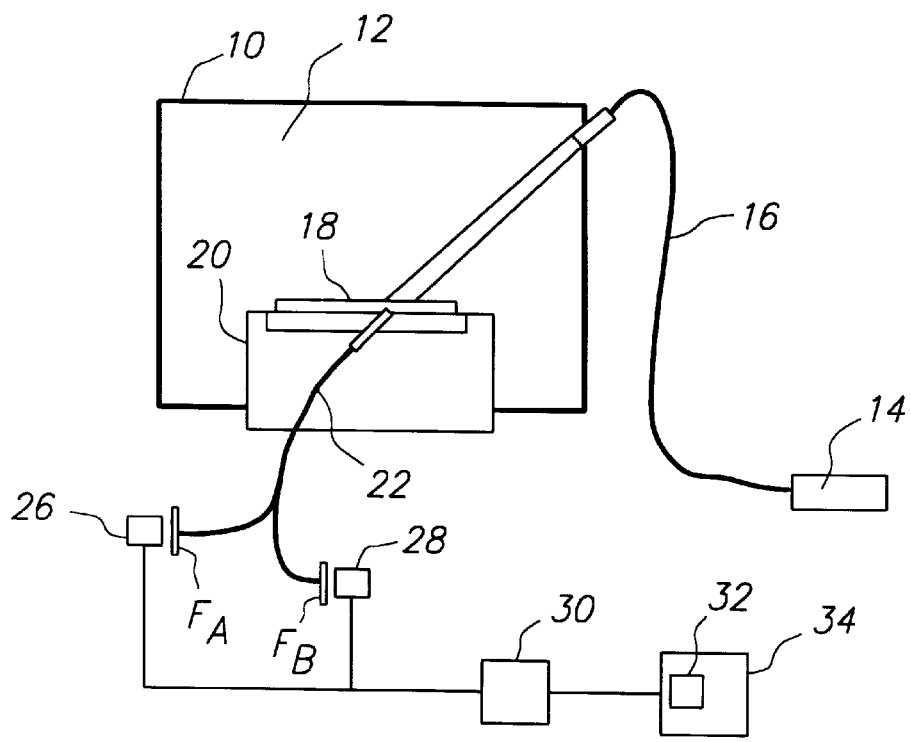
FIG. 3 is a schematic illustration of another embodiment of a temperature sensing apparatus and technique of the present invention.

FIG. 3 shows a further embodiment of the invention wherein a pair of broad band photodiodes 26, 28 may be utilized. For example, in the case of processing Ge or In/Ga/As semiconductor wafers, both photodiodes 26, 28 can comprise germanium photodiodes or indium/gallium/arsenide photodiodes, respectively. Alternatively, any photodiode capable of sensing IR light in the desired range of wavelengths, e.g., up to 1.7 microns, may be used. A suitable optic filter $F_A$, $F_B$ can also be placed in front of each photodiode 26, 28, respectively.

Figure 4:
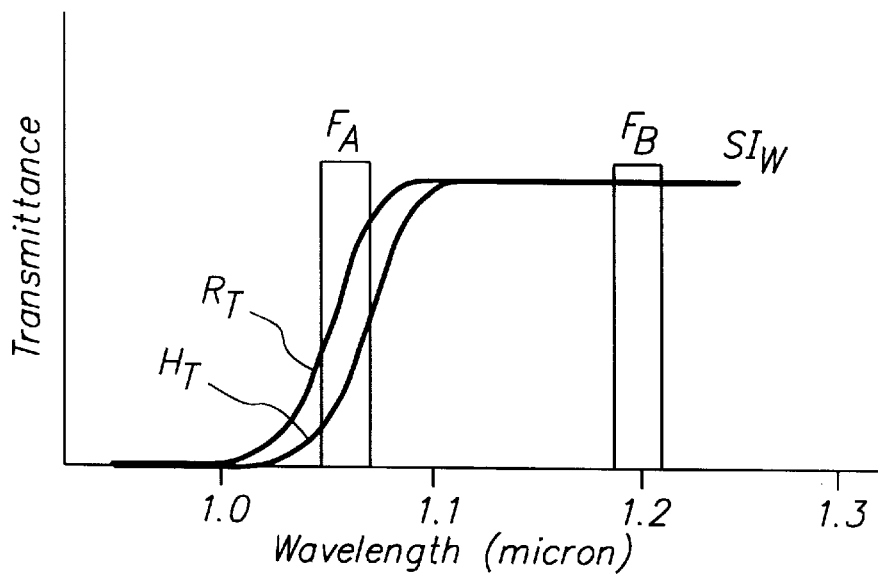
FIG. 4 is a graph illustrating the transmission wavelength spectra of a silicon substrate at different temperatures and illustrating the wavelengths accepted by filters $F_A$ and $F_B$.

FIG. 4 shows how the arrangement of FIG. 3 can be used to detect substrate temperatures. As shown in FIG. 4, one narrow band optic filter $F_A$ can be used for transmission of IR light within a range of wavelengths corresponding to the temperature-induced shift thereby allowing a photodiode 26 to output a signal which is dependent upon substrate temperature. Filter $F_A$ also excludes IR light of other wavelengths to improve the strength and clarity of the signal generated by the photodetector 26.

The other filter $F_B$ and photodiode 28 serve a normalization purpose. The IR light that passes through filter $F_B$ and is received by photodiode 28 is substantially less sensitive to substrate temperature. Since filter $F_B$ is selected to pass IR wavelengths not affected by temperature-induced shifts, the resulting signal from photodiode 28 can be compared to the signal from photodiode 26 in order to more accurately measure the changes in IR light transmitted through the substrate caused by temperature effects. Additional effects which may change during processing such as the optical properties of the substrate surface, plasma emissions, window clouding, and substrate transparency can be factored out to render a more accurate substrate temperature measurement. In addition, this arrangement allows for a continuous comparison or normalization of signals throughout processing of the substrate. Thus, the FIG. 3 embodiment offers advantages over the FIG. 1 embodiment wherein the normalization measurement may be conducted only in the initial period of processing.

The signals generated by the two photodiodes 26, 28 can be processed in any number of ways to obtain the desired temperature reading. For example, the signal produced by the response of the photodiodes 26, 28 can be processed by an analyzing device, which may comprise a plurality of components, in a manner similar to that described above in connection with the first embodiment. For instance, analog signals can be generated by the photodiodes 26, 28 in response to the transmitted light. Such analog signals can be transmitted to a signal amplifier 30 in any suitable manner. The signal amplifier 30 may include filters (not shown) that reduce electronic interference. The analog signals can then be converted to digital signals using an analog-to-digital converter 32. Such digital signals can then be read by a computer 34, compared to each other and/or compared to calibration curve data (see FIG. 5) stored in the computer to generate a temperature reading. The converter 32 may be contained within the housing of the computer as a "board" component. Alternatively, the converter 32 may be a separate device externally connected to the computer 34.

Advantages of the temperature measurement technique and apparatus of the present invention include compact and simple design, fast response, high sensitivity and real-time temperature measurement. Moreover, it is easy to integrate the temperature measurement system of the present invention into commercial process chamber equipment. For example, the temperature measurement apparatus and technique of the present invention can be utilized in TCP™, ECR, and other systems available from Lam Research Corporation, the Assignee of the present invention.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A semiconductor plasma etching apparatus incorporating real time temperature measurement of a substrate during etching thereof at temperatures no greater than 100° C., the apparatus comprising:

a processing chamber;

a semiconductor substrate supported by a substrate support located within said chamber;

a light source directing light onto an exposed surface of said substrate;

at least one photodetector receiving light transmitted through said substrate over a range of wavelengths at which transmittance of the light through the substrate varies as a function of the substrate temperature, the photodetector generating a signal corresponding to an amount of light received by the photodetector; and an analyzing device that receives the signal from the photodetector and determines real time temperature of the substrate based on the signal during etching of the substrate at temperatures no greater than 100° C.

2. The semiconductor processing apparatus of claim 1, wherein the photodetector comprises a silicon, germanium, or indium-gallium-arsenide photodiode.

3. The semiconductor processing apparatus of claim 1, wherein the photodetector comprises a broad band photodiode capable of sensing infrared light having a wavelength of up to 1.7 microns, the transmitted light passing through a narrow-band filter prior to being received by the photodetector.

4. The semiconductor processing apparatus of claim 1, wherein the at least one photodetector comprises first and second photodiodes, each of said photodiodes being of a material selected from the group consisting of silicon, germanium and indium/gallium/arsenide.

5. The semiconductor processing apparatus of claim 1, wherein
said light source comprises an incandescent tungsten light bulb and a fiber optic transmission cable transmitting light from said light source into said chamber by passing the light through a window of the apparatus.

6. The semiconductor processing apparatus of claim 1, wherein said analyzing device comprises:
a signal amplifier receiving the signal from the photodetector and outputting an amplified signal;
an analog-to-digital signal converter receiving the amplified signal and converting the amplified signal into a digital signal; and
a computer receiving the digital signal and comparing the digital signal to calibration data in determining the real time temperature of the substrate.

7. The semiconductor processing apparatus of claim 1, wherein the analyzing device compares calibration data based on a signal outputted from the photodetector when the substrate is at room temperature with a signal outputted from the photodetector during processing of the substrate.

8. The semiconductor processing apparatus of claim 4, further comprising:
a first filter allowing transmission of infrared light over a range of wavelengths corresponding to a portion of a transmission curve for the substrate to the first photodiode;
a second filter allowing transmission of infrared light over a range of wavelengths at which transmittance of the infrared light is not affected by temperature of the substrate to the second photodiode; and
said analyzing device comparing the signal from the first photodiode to the signal from the second photodiode in determining the real time temperature of the substrate.

9. A method for measuring real time temperature of a semiconductor substrate during processing within a processing device, said processing device defining a processing chamber in which said substrate is supported by a substrate support, said method comprising steps of:
introducing light into said chamber so as to intersect and pass through said substrate;
measuring intensity of infrared light transmitted through said substrate with a photodetector and outputting a signal corresponding to the measured intensity of the transmitted light;
analyzing said signal and determining real time temperature of the substrate based on the signal during etching of the substrate at temperatures no greater than 100° C.

10. The method of claim 9, wherein light from said light source is modulated during the measuring step.

11. The method of claim 9, wherein the substrate comprises a silicon semiconductor wafer and the photodetector comprises a silicon photodiode.

12. The method of claim 9, wherein the substrate comprises a germanium semiconductor wafer and the photodetector comprises a germanium photodiode.

13. The method of claim 9, wherein the substrate comprises an indium-gallium-arsenide silicon semiconductor wafer and the photodetector comprises an indium-gallium-arsenide photodiode.

14. The method of claim 9, wherein the measuring step is carried out by transmitting said infrared light through a narrow-band filter and then to the photodetector, the photodetector comprises a broad-band photodiode capable of sensing infrared light having a wavelength of up to 1.7 microns.

15. The method of claim 9, wherein the measuring step is carried out by detecting light transmitted through the substrate with first and second photodetectors, the first photodetector outputting a variable signal which varies as a function of substrate temperature and the second photodetector outputting a reference signal which does not vary as a function of substrate temperature, the variable signal being compared to the reference signal during the analyzing step.

16. The method of claim 15, wherein during the measuring step:
infrared light is transmitted through a first filter that allows passage of infrared light over a range of wavelengths corresponding to a portion of a transmission curve for the substrate to the first photodiode;
infrared light is transmitted through a second filter that allows passage of infrared light over a range of wavelengths at which transmission of the infrared light is not affected by temperature of the substrate to the second photodiode.

17. The method of claim 9, wherein said analyzing step comprises:
transmitting said signal to a signal amplifier and generating an amplified signal;
transmitting said amplified signal to an analog-to-digital signal converter and converting said amplified signal into a digital signal; and
transmitting said digital signal to a computer and comparing said digital signal to calibration data during the analyzing step.

18. The method of claim 9, wherein said analyzing step comprises comparing a signal generated by the photodetector while the substrate is at room temperature to a signal generated by the photodetector during processing of the substrate.

19. A method for measuring real time temperature of a semiconductor substrate during processing within a processing device, said processing device defining a processing chamber in which said substrate is supported by a substrate support, said method comprising steps of:
introducing light generated by a tungsten light bulb into said chamber so as to intersect and pass through said substrate;
transmitting said light from said light bulb into said chamber with a fiber optic transmission cable;
collecting and transmitting said infrared light transmitted through said substrate to a photodetector with an optical fiber bundle;
measuring intensity of infrared light transmitted through said substrate with said photodetector and outputting a signal corresponding to the measured intensity of the transmitted light; and
analyzing said signal and determining real time temperate of the substrate based on the signal, the real time temperature being determined based on the ratio of the light transmitted through the substrate compared to the light from the light source which is incident on the substrate.

20. A semiconductor processing apparatus incorporating real time temperature measurement of a substrate during processing thereof, the apparatus comprising:
a processing chamber;
a semiconductor substrate supported by a substrate support located within said chamber;
a light source directing light onto an exposed surface of said substrate;

a photodetector receiving light from the light source which is transmitted through said substrate, the photodetector receiving the light over a range of wavelengths at which transmittance of the light through the substrate varies as a function of the substrate temperature, the photodetector generating a signal corresponding to an amount of light received by the photodetector; and an analyzing device that receives the signal from the photodetector and determines real time temperature of the substrate based on the signal, the real time temperature being determined based on the ratio of the light transmitted through the substrate compared to the light from the light source which is incident on the substrate.

21. A method for measuring real time temperature of a semiconductor substrate during processing within a processing device, said processing device defining a processing chamber in which said substrate is supported by a substrate support, said method comprising steps of:

introducing light into said chamber so as to intersect and pass through said substrate;

measuring intensity of infrared light from the light source which is transmitted through said substrate with a photodetector, the photodetector outputting a signal corresponding to the measured intensity of the transmitted light; and analyzing said signal and determining real time temperature of the substrate based on the signal, the real time temperature being determined based on the ratio of the light transmitted through the substrate compared to the light from the light source which is incident on the substrate.

* * * * *